United States Patent [19]

Hoetjer

[11] Patent Number: 4,510,278

[45] Date of Patent: Apr. 9, 1985

[54] MANUFACTURE OF CHIPBOARD AND A NOVEL SUITABLE BONDING AGENT

[75] Inventor: Jan J. Hoetjer, Ten Boer, Netherlands

[73] Assignee: Methanol Chemie Nederland V.o.F., Haren, Netherlands

[21] Appl. No.: 576,164

[22] Filed: Feb. 1, 1984

Related U.S. Application Data

[63] Continuation of Ser. No. 366,309, Apr. 7, 1982.

[30] Foreign Application Priority Data

Apr. 7, 1981 [NL] Netherlands ............... 8101700

[51] Int. Cl.$^3$ ............................... B29J 5/00
[52] U.S. Cl. ............................ 524/14; 524/27; 156/331.3; 156/331.8; 264/109; 428/407; 428/528
[58] Field of Search ............... 524/14, 16, 27; 264/109, 128; 428/396, 407, 528; 156/62.2, 330.9, 331.3, 331.8; 527/105

[56] References Cited

U.S. PATENT DOCUMENTS

| | | | |
|---|---|---|---|
| 2,328,424 | 8/1943 | D'Alelio | 524/14 |
| 2,768,754 | 10/1956 | Briggs | 524/14 |
| 2,772,197 | 11/1956 | Kozdemba | 156/331.3 |
| 3,097,177 | 7/1963 | Emerson | 527/105 |
| 3,905,847 | 9/1975 | Black | 264/109 |
| 4,362,827 | 12/1982 | Tinkelenberg et al. | 524/16 |

Primary Examiner—John Kight
Assistant Examiner—Nathan M. Nutter
Attorney, Agent, or Firm—Cushman, Darby & Cushman

[57] ABSTRACT

An improved method for the preparation of particleboard wherein a cellulose-containing particulate material is provided with a urea formaldehyde resin bonding agent and thereafter shaped and hardened at an elevated temperature and pressure. The bonding agent used is a urea-formaldehyde resin solution additionally containing melamine in an amount of 1.0 and 10 percent by weight, relative to the total amount of resin solids. The molar ratio of formaldehyde to mole equivalents of amino groups in the bonding agent is in the range of between 0.500:1 and 0.575:1.

10 Claims, No Drawings

MANUFACTURE OF CHIPBOARD AND A NOVEL SUITABLE BONDING AGENT

This is a continuation of application Ser. No. 366,309, filed Apr. 7, 1982.

BACKGROUND OF THE INVENTION

The invention relates to an improved method for the manufacture of particleboard from a cellulose-containing material using an aminoplast or an amino resin adhesive as the bonding agent, as well as a novel bonding agent suitable for use in such a method. As used herein, the term 'particleboard' shall be understood to mean a composition board made up of individual, wood particles such as chips, flakes, fibers, and the like, or of any other particulate cellulose-based material which have been coated with a resin bonding agent and formed into shape by pressure and heat.

It is known to manufacture particleboard with an urea-formaldehyde resin as the bonding agent, wherein the molar ratio of formaldehyde to urea is typically in the range of about 1.5:1 to 1.9:1. However, if this formaldehyde to urea molar ratio is above 1.3, the resulting particleboard may continue to release formaldehyde into the environment after manufacture, and even after it is applied in its ultimate use, creating the potential for health or environmental problems. Particleboard manufactured in accordance with the known methods typically has a formaldehyde emission in the range of between about 0.03 and 0.06 (FESYP perforator test, wt % of formaldehyde released).

Applicant has found that it is possible to produce particleboard having a very low formaldehyde emission level by using a urea-formaldehyde resin having a molar ratio of formaldehyde to urea of about 1.1:1, but the mechanical properties of particleboard by such method are unsatisfactory, particularly if the boards are stacked after pressing while they are still warm. An important disadvantage is also that, regardless of stacking, the boards show a large degree of swelling when in contact with water. Although these unsatisfactory mechanical properties can be improved by using more than the conventional amount of bonding agent, this overcomes the disadvantage only to a limited extent.

SUMMARY OF THE INVENTION

It is the object of the present invention to provide an improved method for the manufacture of particleboard having a lower formaldehyde emission level than particleboard produced by conventional processes, yet retaining satisfactory mechanical properties. It is additionally an object of this invention to provide an improved bonding agent suitable for use in such method. It is a further objective of this invention to provide a method for producing an improved particleboard utilizing conventional equipment and basic processing sequence.

According to the invention, particleboard is produced in accordance with conventional processing steps whereby a cellulose-containing particulate material is provided with a bonding agent comprised of an urea-formaldehyde resin, and thereafter shaped and hardened at an elevated temperature and pressure to produce the particleboard. In accordance with the improvement, the bonding agent utilized is a urea-formaldehyde resin solution additionally containing melamine in an amount of between 1.0 and 10 percent by weight, relative to the total amount of resin solids, wherein the molar ratio of formaldehyde to amino groups ($F/NH_2$ ratio) in the bonding agent is in the range of between 0.500:1 and 0.575:1. By using the method of this invention with the novel bonding agent, it is possible to manufacture particleboard having a very low formaldehyde emission, as low as 0.01 percent (FESYP perforator test) or even lower, yet still retaining satisfactory mechanical properties in the particleboard so produced.

The cellulose-containing material may consist of wood particles, chips, or fibers of either pine or hard wood, of any conventional size. The bonding agent can be applied to the material by one of the conventional methods, such as by spraying or tumbling. Satisfactory particleboard can be obtained using between about 6 and 15 percent by weight bonding agent, calculated as resin solids, relative to the dry weight of the cellulose-containing material. Preferably, however, the amount of bonding agent will be between about 8 and 12 percent by weight.

The cellulose-containing material may also be provided with conventional additives such as a moisture repellant, a curing catalyst, fungicides, or other antimicrobial agents, defoamers, or the like. These additives may be added either together with the resin solution, or separately. After application of the bonding agent and any other additives, the cellulose-containing material is formed into a mat and is hardened under a pressure of up to 3.5 $N/mm^2$ and a temperature of between about 140° C. and 220° C. to form the particleboard.

The improved bonding agent used in this invention is a urea-formaldehyde resin solution containing significantly less formaldehyde than in conventional resins, and additionally containing melamine, but in an amount significantly less than conventional melamine-modified urea-formaldehyde resin solutions. Specifically, the molar ratio of formaldehyde to mole equivalents of amino groups in said bonding agent resin is between 0.500:1 and 0.575:1. Preferably, the bonding agent will have a formaldehyde to urea equivalents ratio of between 0.525:1 and 0.565:1, and a ratio of close to 0.54:1 has been found to provide the optimal combination of satisfactory mechanical strength with low formaldehyde emission level.

The ratio of formaldehyde to mole equivalents of amino groups ($F/NH_2$ ratio) can easily be calculated by determining the total amount of moles of urea and melamine which have been used in the preparation of the bonding agent and calculating on the basis of these data the total amount of mole equivalents of amino groups. The amount of formaldehyde used will also be known, so that the ratio $F/NH_2$ may be calculated.

One may also determine the molar ratio of formaldehyde to urea, i.e. disregarding the melamine. This molar ratio will generally be not more than about 1.2:1 and will in particular be between about 1.1:1 and 1.18:1.

The melamine content of the bonding agent in accordance with the invention is very low, notably lower than that of conventional melamine-modified urea-formaldehyde resin solutions. Specifically, the melamine content is in the range of between 1.0 and 10 percent by weight calculated relative to the total amount of resin solids, and preferably will be between 1.5 and 9 percent by weight. At the lower end of the range of melamine content, such as 2 percent by weight, it may be advisable to use a relatively larger amount of resin in relation to the amount of cellulose-containing material, whereas a relatively smaller amount of bonding agent need be used when fairly high melamine contents, such as 8 percent by weight, are used in the resin. A resin containing between about 3 and 6 percent by weight melamine is preferable for general purposes.

Although for purposes of the above calculations, the melamine is considered as the pure chemical compound, it should be understood that melamine may actually be added or present in the form of a melamine-formaldehyde condensate or as a melamine-urea-formaldehyde condensate.

The solids contents of the resin solution utilized in making the particleboard of the present invention is not of critical importance, so long as it is possible to bring the resin solution to a viscosity suitable for spraying. In most instances, a suitable solids content will be between about 50 and 75 percent by weight. The expressions 'solids' or 'resin solids' are used herein to mean the dry residue which would remain after evaporation of the resin solution for two hours at 120° C.

The bonding agent of this invention may be prepared by several methods. For instance, the condensation of urea and formaldehyde can first be carried out with the addition of melamine during the course of the condensation, preferably in the last stage. This condensation can be carried out in a conventional manner, for instance as a pH of between about 4 and 8, and a temperature of between 75° C. and the boiling point of the solution. In many cases, it may be advantageous to maintain the formaldehyde to urea ratio somewhat higher at the beginning of the condensation, such as between 1.6:1 and 3.0:1, and thereafter add the required additional amount of urea at a later stage of the condensation. A limited amount of the required urea may even be added after completion of the condensation reaction.

A melamine-formaldehyde resin may be added to the urea-formaldehyde resin rather than pure melamine. It is also possible to separately prepare a urea-formaldehyde resin solution having a low formaldehyde to urea ratio and thereafter add a melamine-formaldehyde resin thereto after completion of the urea-formaldehyde condensation. The melamine-formaldehyde resin may be of a conventional molar ratio of formaldehyde to melamine, for instance between 1.5:1 and 1.8:1. It is also possible to begin with a conventional melamine-modified urea formaldehyde resin and to mix this resin, if required with heating, with a urea-formaldehyde resin having a much lower formaldehyde to urea ratio, and optionally with an additional amount of urea to reach the appropriate ratios of melamine, urea, and formaldehyde as required for this invention.

The reactivity of an aminoplast adhesive is determined by adding a standard amount of catalyst (usually ammonium chloride) to the resin solution and measuring the gel time. The gel time is the time in which an aliquot of catalysed resin solution sealed in a glass tube suspended in an oil bath at 100° C. is converted to a gel. It is generally thought that in order to obtain a good curing and a strong bond, the adhesive should have a fairly short gel time, say between 40 and 90 seconds. The adhesive solutions according to the invention have long gel times, e.g. 100 to 150 seconds with conventional amounts of catalyst. Yet such catalyzed adhesive solutions can be used to produce particleboard with improved physical properties.

Is is to be noted that this phenomenon of the increase in gel time does not occur with the conventional resins in which 25% by weight or more melamine has been incorporated. Applicant assumes that in the latter case the curing of the melamine resin component, which occurs at a pH close to neutral, overshadows the buffering action of melamine.

DETAILED DESCRIPTION OF PREFERED EMBODIMENTS

Example 1

In a convention resin kettle, 29 kg of formaldehyde (37%) and 9.75 kg of urea were mixed and heated to the boiling point. Thereafter, the pH was brought to a value of 5 by the addition of hydrochloric acid, which initiated the reaction. After a condensation period of 50 minutes at the boiling point, the reaction was quenched by adding a sufficient quantity of a base (sodium hydroxide) to bring the pH to a value of 8. Next, 1.24 kg of melamine were added to the reaction mixture while maintaining the pH at a value of 8, and the temperature near the boiling point. The resulting mixture was stirred for ½ hour, after which 9.75 kg of urea were added and sufficient water was distilled off to bring the solids content of the resulting solution to 65% by weight. The solids contents was determined by heating a sample for 2 hours at 120° C. and weighing the residue. Thereafter the reaction mixture was cooled. In this manner, 39.8 kg of resin solution were obtained with a melamine content of 4.77% by weight and a $F/NH_2$ ratio of 0.526, referred to as 'adhesive A'.

This resin solution was used as the bonding agent in the preparation of chipboard having a thickness of 17 mm. The catalysed resin solution was sprayed on wood chips (70% by wt fir, 30% by wt of beech) and the chips were spread by hand into three-layered mats which were then converted to board by pressing. In this and in the following examples, the chips were also provided with 0.4 wt % (on dry chips) of Mobilcer (RTM), a wax-based hydrophobic agent. The amount of bonding agent used was 11 percent by weight of resin solids, relative to dry chips, in all layers. The press applied a pressure of 3.4 $N/mm^2$ and was at a temperature of 180° C., the compression time was 13 seconds per mm of board thickness.

The chipboard thus obtained was determined to have the following properties:

| | |
|---|---|
| density | 680 $kg/m^3$ |
| tensile strength | 0.64 $N/mm^2$ |
| swelling | 14.3% |
| (24 hrs immersion at 20° C.) | |
| water content | 7.1% |
| formaldehyde emission | 0.008% |
| (FESYP perforator test) | |

Example 2

Adhesives B and C were prepared by the method disclosed in example 1. For adhesive B the amount of melamine added in the second step was 0.80 kg and the amount of urea added in the last step was 9.96 kg. For adhesive C these amounts were respectively 1.62 kg of melamine and 9.56 kg of urea. As a comparison, adhesive Y was prepared by the same method, however without the addition of melamine and with addition of 10.34 kg of urea in the last step.

Adhesive B contains 3.08% by wt of melamine and has a $F/NH_2$ ratio of 0.529. Adhesive C contains 6.15% by wt of melamine and has a $F/NH_2$ ratio of 0.524. The comparative adhesive Y contains no melamine and has a F/N₂ ratio of 0.534.

These adhesives were tested by using them to produce particle board by the process disclosed in example 1. However, for the thin outer layers chips containing 12% by weight of adhesive, calculated on the dry (atro) chips, were used and for the core layer chips containing either 6 or 8 or 12% by weight of adhesive were used. The physical properties of the boards so obtained are presented in table 1. All boards had a formaldehyde emission of less than 0.01% (perforator test).

TABLE 1

| adhesive type | adhesive, amount middle layer, wt. % | density kg/m³ | tensile strength N/mm² | swelling 24 hrs, % |
|---|---|---|---|---|
| B | 6 | 689 | 0.43 | 24.3 |
| C | 6 | 684 | 0.41 | 24.3 |
| Y* | 6 | 683 | 0.39 | 31.4 |
| B | 10 | 678 | 0.54 | 17.5 |
| C | 10 | 669 | 0.57 | 16.6 |
| Y* | 10 | 656 | 0.49 | 22.8 |
| B | 12 | 668 | 0.59 | 16.2 |
| C | 12 | 663 | 0.66 | 14.4 |
| Y* | 12 | 666 | 0.52 | 20.5 |
| A | 11% all layers | 680 | 0.64 | 14.3 |

*not according to the invention.

Example 3

An adhesive solution D was obtained by mixing a urea-formaldehyde resin solution with a small amount of melamine-formaldehyde resin solution. The resulting adhesive solution has a solids content of 56% by weight, a $F/NH_2$ ratio of 0.550 and a melamine content of 5.33% by weight based on resin solids.

By the same method an adhesive solution E was prepared at a solids content of 53% by weight, a $F/NH_2$ ratio of 0.500 and a melamine content of 4.87% by weight based on resin solids. As a comparison, an adhesive Z was prepared having a solids content of 56% weight, a $F/NH_2$ ratio of 0.550 which did contain only urea and no melamine.

These adhesives were used, after addition of a catalyst, to prepare particle board having a unitary structure and a thickness of 18 mm. The amount of adhesive was 9% by weight (resin solids on dry chips) in all cases and the press conditions were 180° C. at 3.4 N/mm² for 17 seconds/mm of board thickness. In all cases, the gel time of the catalysed resin solution was determined. As a measure for the quality of the board, the tensile strength after 2 hours immersion in water of 20° C. was determined (V-20 strength according to DIN 68763). The relevant data are presented in table 2.

TABLE 2

| adhesive | NH₄Cl wt. % on resin solid | 4NHCl | gel time sec | density kg/m³ | V-20 N/mm² | swelling % (24 hrs) |
|---|---|---|---|---|---|---|
| D | 1.5 | — | 180 | 612 | 0.65 | 13.4 |
| D | 1.5 | 3.5 | 129 | 619 | 0.78 | 13.1 |
| D | 1.5 | 5.0 | 95 | 617 | 0.76 | 12.9 |
| E | 1.5 | — | 220 | 614 | 0.68 | 21.5 |
| E | 1.5 | 4 | 130 | 625 | 0.67 | 15.7 |
| E | 1.5 | 7.5 | 93 | 617 | 0.75 | 16.5 |
| Z* | 0.15 | — | 180 | 594 | 0.16 | 17.2 |
| Z* | 0.25 | — | 120 | 571 | 0.09 | 15.6 |
| Z* | 0.75 | — | 84 | 608 | 0.74 | 13.3 |

*not according to the invention.

What is claimed is:

1. In a method for the preparation of particleboard wherein a cellulose-containing particulate material is provided with a urea-formaldehyde resin bonding agent and thereafter shaped and hardened at an elevated temperature and pressure, the improvement wherein said bonding agent is a urea-formaldehyde resin solution additionally containing melamine in an amount of between 1.0 and 10 percent by weight, relative to the total amount of resin solids, wherein the molar ratio of formaldehyde to mole equivalents of amino groups is in the range of between 0.500:1 and 0.575:1.

2. The method of claim 1 wherein said bonding agent contains melamine in an amount of between 1.5 and 9 percent by weight relative to the total amount of resin solids.

3. The method of claim 2 wherein said bonding agent contains melamine in an amount of between 3 and 6 percent by weight relative to the total amount of resin solids.

4. The method of claim 1, 2, or 3 wherein the molar ratio of formaldehyde to mole equivalents of amino groups is in the range of between 0.525:1 and 0.565:1.

5. The method of claim 1 wherein the amount of said bonding agent calculated as resin solids is between about 8 and 12 percent by weight relative to the weight of said cellulose-containing particulate material calculated on a dry basis.

6. A melamine-containing urea-formaldehyde resin solution containing between about 1 and 10 percent by weight melamine, relative to the total amount of resin solids, wherein the molar ratio of formaldehyde to mole equivalents of amino groups is in the range of between 0.500:1 and 0.575:1.

7. The resin solution of claim 6 wherein said melamine content is between 1.5 and 9 percent by weight relative to the total amount of resin solids.

8. The resin solution of claim 7 wherein the melamine content is between 3 and 6 percent by weight, relative to the total amount of resin solids.

9. The resin solution of claim 6, 7, or 8 wherein said molar ratio of formaldehyde to mole equivalents of amino groups is in the range of between 0.525:1 and 0.565:1.

10. Particleboard comprised of a cellulose-containing particulate material and a urea-formaldehyde resin bonding agent wherein said bonding agent additionally contains melamine in an amount of between 1.0 and 10 percent by weight, relative to the total amount of resin solids, and wherein said bonding agent is the reaction product of formaldehyde with said urea and melamine in a molar ratio of formaldehyde to mole equivalents of amino groups in the range of between 0.500:1 and 0.575:1.

* * * * *